US010388049B2

(12) United States Patent
Songa et al.

(10) Patent No.: US 10,388,049 B2
(45) Date of Patent: Aug. 20, 2019

(54) AVIONIC DISPLAY SYSTEMS AND METHODS FOR GENERATING AVIONIC DISPLAYS INCLUDING AERIAL FIREFIGHTING SYMBOLOGY

(71) Applicant: HONEYWELL INTERNATIONAL INC., Morris Plains, NJ (US)

(72) Inventors: Anil Kumar Songa, Karnataka (IN); Mallikarjuna Narala, Karnataka (IN); Sudheer B M, Karnataka (IN); Suvankar Manna, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 18 days.

(21) Appl. No.: 15/480,860

(22) Filed: Apr. 6, 2017

(65) Prior Publication Data

US 2018/0292661 A1 Oct. 11, 2018

(51) Int. Cl.

*A62C 3/02* (2006.01)
*G01C 23/00* (2006.01)
*G06T 11/60* (2006.01)

(52) U.S. Cl.

CPC ............ *G06T 11/60* (2013.01); *A62C 3/0228* (2013.01); *G01C 23/005* (2013.01)

(58) Field of Classification Search

CPC ...... G06T 19/006; G01C 23/005; B64D 1/16; B64D 2045/009; A62C 3/0228–025

See application file for complete search history.

(56) References Cited

U.S. PATENT DOCUMENTS

| | | | |
|---|---|---|---|
| 6,556,981 | B2 | 4/2003 | Pedersen et al. |
| 6,696,958 | B2 | 2/2004 | Anderson |
| 7,337,156 | B2 | 2/2008 | Wippich |
| 8,467,953 | B2 | 6/2013 | Naderhirn |

(Continued)

FOREIGN PATENT DOCUMENTS

| | | | |
|---|---|---|---|
| CN | 101650866 | A | 2/2010 |
| WO | 9735433 | A1 | 9/1997 |

OTHER PUBLICATIONS

Extended EP Search Report for Application No. 18164816.3 dated Nov. 15, 2018.

(Continued)

*Primary Examiner* — Daniel F Hajnik

(74) *Attorney, Agent, or Firm* — Lorenz & Kopf, LLP

(57) ABSTRACT

Avionic display systems and methods are provided for generating avionic displays including aerial firefighting symbology, which enhance pilot situational awareness and decision during aerial firefighting operations. In an embodiment, the avionic display system includes an avionic display device, a thermal image sensor configured to detect thermal image data external to the aircraft, and a controller operably coupled to the avionic display device and to the thermal image sensor. During operation of the avionic display system, the controller compiles a fire map of a fire-affected area in proximity of the aircraft based, at least in part, on the thermal image data collected by the thermal image sensor. The controller further generates a first avionic display on the avionic display device including graphics representative of a field of view (FOV) of the thermal image sensor and portions of the fire map outside of the FOV of the thermal image sensor.

15 Claims, 4 Drawing Sheets

(56) References Cited

U.S. PATENT DOCUMENTS

| | | | | |
|---|---|---|---|---|
| 9,214,088 | B2 | 12/2015 | Kreitmair-Steck et al. | |
| 9,483,951 | B1 * | 11/2016 | McCusker | G08G 5/0091 |
| 2004/0160341 | A1 * | 8/2004 | Feyereisen | G01C 23/00 340/970 |
| 2004/0238186 | A1 * | 12/2004 | O'Dwyer | A62C 3/025 169/47 |
| 2005/0090201 | A1 * | 4/2005 | Lengies | H04B 7/18506 455/41.2 |
| 2005/0174350 | A1 * | 8/2005 | Ridenour | G08G 5/0013 345/440 |
| 2006/0004753 | A1 * | 1/2006 | Coifman | G06F 17/30675 |
| 2008/0039984 | A1 * | 2/2008 | Bitar | G01C 21/20 701/3 |
| 2010/0036549 | A1 | 2/2010 | Kwan et al. | |
| 2010/0113149 | A1 * | 5/2010 | Suddreth | G01C 23/00 463/31 |
| 2011/0264312 | A1 * | 10/2011 | Spinelli | G08G 5/0021 701/16 |
| 2012/0139778 | A1 * | 6/2012 | Bunch | G01S 7/04 342/26 B |

OTHER PUBLICATIONS

Partial EP Search Report for Application No. 18164816.3 dated Sep. 9, 2018.

* cited by examiner

AVIONIC DISPLAY SYSTEMS AND METHODS FOR GENERATING AVIONIC DISPLAYS INCLUDING AERIAL FIREFIGHTING SYMBOLOGY

TECHNICAL FIELD

The following disclosure relates generally to aircraft and, more particularly, to avionic display systems and methods for generating avionic displays including aerial firefighting symbology, which enhances situational awareness and aids pilot decision-making during aerial firefighting operations.

BACKGROUND

Aerial firefighting commonly involves the operation of aircraft (A/C) in low altitude, high risk flight environments. Such flight environments may encompass fire-affected areas ranging from sparsely-populated or unpopulated regions of wilderness to densely-populated urban areas, such city environments in which A/C may be employed to combat structure fires in high-rise buildings. The flight environments may be characterized by elevated and shifting thermal gradients, dynamic wind conditions, and fire-induced updrafts. Visibility may be compromised by adverse weather conditions, time of day, and/or by the presence of large amounts of smoke, ash, and other airborne particulate matter. The airspace encompassing a fire-affected region may be occupied by other A/C, elevated terrain, man-made structures, and other obstacles. It is unsurprising, then, that aerial firefighting operations are often associated with high levels of risk. This is underscored by the fact that aviation-related accidents routinely account for a significant fraction of total firefighter fatalities on an annual basis. According to the National Institute for Occupational Safety and Health (NIOSH), the leading causes of fatal crashes during aerial firefighting operations include engine, structure, and component failure; pilot loss of control; failure to maintain adequate clearances from terrain, water, and obstacles; and hazardous weather conditions.

Enhanced Vision Systems (EVSs) offer the potential to reduce the number of accidents and fatalities occurring during aerial firefighting operations. Generally, an EVS is an aircraft-based system including at least one thermal image sensor, such as an infrared camera or millimeter wave radar sensor, which collects thermal image data external to the A/C during flight. The thermal image data collected by the EVS sensor is presented to the aircrew as an EVS image, which appears on a Head Up Display (HUD) or a Head Down Display (HDD) located in the A/C cockpit. In certain instances, the EVS image may be combined or blended with another database-dependent display to yield a composite display. For example, a Combined Vision System (CVS) display can be produced by integrating an EVS image into the Synthetic Vision System (SVS) image of a Synthetic Vision Primary Flight Display (SV-PFD). The larger database-dependent SVS image provides a contextual view exceeding the scope of the EVS image utilizing a stored terrain database, while the EVS image provides real-time, sensor-derived visual information more closely resembling the actual flight environment of the A/C. Such a CVS display and, specifically, the EVS image may thus serve as a useful, vision-enhancing tool during aerial firefighting operations in which visibility is often hindered.

While capable of improving pilot visibility during aerial firefighting operations, CVS displays and other avionic display incorporating EVS images are generally not adapted to address the unique challenges and mental tasks encountered by pilots in the context of aerial firefighting. There thus an exists an ongoing demand for avionic display systems, such as vision enhancing systems having augmented functionalities, which further improve situational awareness and aid pilot decision-making during aerial firefighting operations. Embodiments of such avionic display systems are described herein, as are methods for generating avionic displays including aerial firefighting symbology.

BRIEF SUMMARY

Avionic display systems for generating avionic displays, which include symbology or graphics useful in aerial firefighting operations, are provided. In an embodiment, the avionic display system includes an avionic display device, a thermal image sensor, and a controller operably coupled to the display device and to the thermal image sensor. The thermal image sensor can be an infrared camera, a millimeter wave radar device, or another sensor suitable for gathering thermal image data within a sensor Field of View (FOV) external to an aircraft (A/C). During system operation, the controller compiles a fire map of a fire-affected area in proximity of the A/C based, at least in part, on the thermal image data collected by the thermal image sensor. Concurrently, the controller generates a first avionic display having a display Field of View (FOV) on the avionic display device. The first avionic display is generated to include symbology representative of the sensor FOV, as well as graphics representative portions of the fire map located outside of the sensor FOV. The first avionic display can produced as a two dimensional avionic display, such as a Horizontal Navigation (HNAV) or Vertical Navigation (VNAV) display. Alternatively, the first avionic display can produced as a three dimensional avionic display, such as a Combined Vision System (CVS) display.

In another embodiment, the avionic display system includes an avionic display device and a controller, which is operably coupled to the display device and which generates an avionic display thereon. The controller generates avionic display to include graphics depicting a fire-affected area in proximity of the A/C, as well as symbology indicative of a current A/C position and the boundaries of a virtual fire alert envelope surrounding the current A/C position. The controller may further selectively generate visual alerts on the avionic display when, for example, fire encroaches into the fire alert envelope. The controller may also actively adjust the boundaries of the fire alert envelope with respect to the A/C position in response to variations in the current A/C position (current altitude, latitude, and/or longitude), current wind speeds, local fire temperatures, and/or other such parameters. In still further implementations, the controller may also be configured to establish whether a fire escape route is available to the A/C based, at least in part, on the fire map and the fire alert envelope. Specifically, the controller may repeatedly search for and identify horizontal or substantially level fire escape routes that avoid encroachment of fire into the fire alert envelope and which require minimal, if any gain in altitude by the A/C. If establishing that a substantially level fire escape route is available to the A/C, the controller generates graphics on the avionic display identifying the fire escape route. Conversely, if the controller cannot establish a substantially level fire escape route, a visual alert may be generated on the avionic display.

Methods are further provided for generating avionic displays including aerial firefighting symbology. Embodiments of the method are carried-out by an avionic display system including an avionic display device, a thermal image sensor (e.g., an infrared camera or MMW radar device) having a sensor FOV, and a controller operably coupled to the avionic display device and to the thermal image sensor. During performance of the method, the controller may establish a fire map of a fire-affected area in proximity of the A/C by recalling the fire map from a memory, by receiving the fire map over a wireless datalink, and/or by compiling the fire map utilizing thermal image data received from the sensor. The controller further updates the fire map on repeated bases utilizing, for example, thermal image data captured by the thermal image sensor as the sensor FOV sweeps across the fire-affected area. The controller utilizes the fire map to generate a first avionic display on the avionic display device. The controller generates the first avionic display to include symbology denoting the sensor FOV and graphics representative of portions of the fire map located outside of the sensor FOV, but within the display FOV.

BRIEF DESCRIPTION OF THE DRAWINGS

At least one example of the present disclosure will hereinafter be described in conjunction with the following figures, wherein like numerals denote like elements, and.

DETAILED DESCRIPTION

Figure 1:
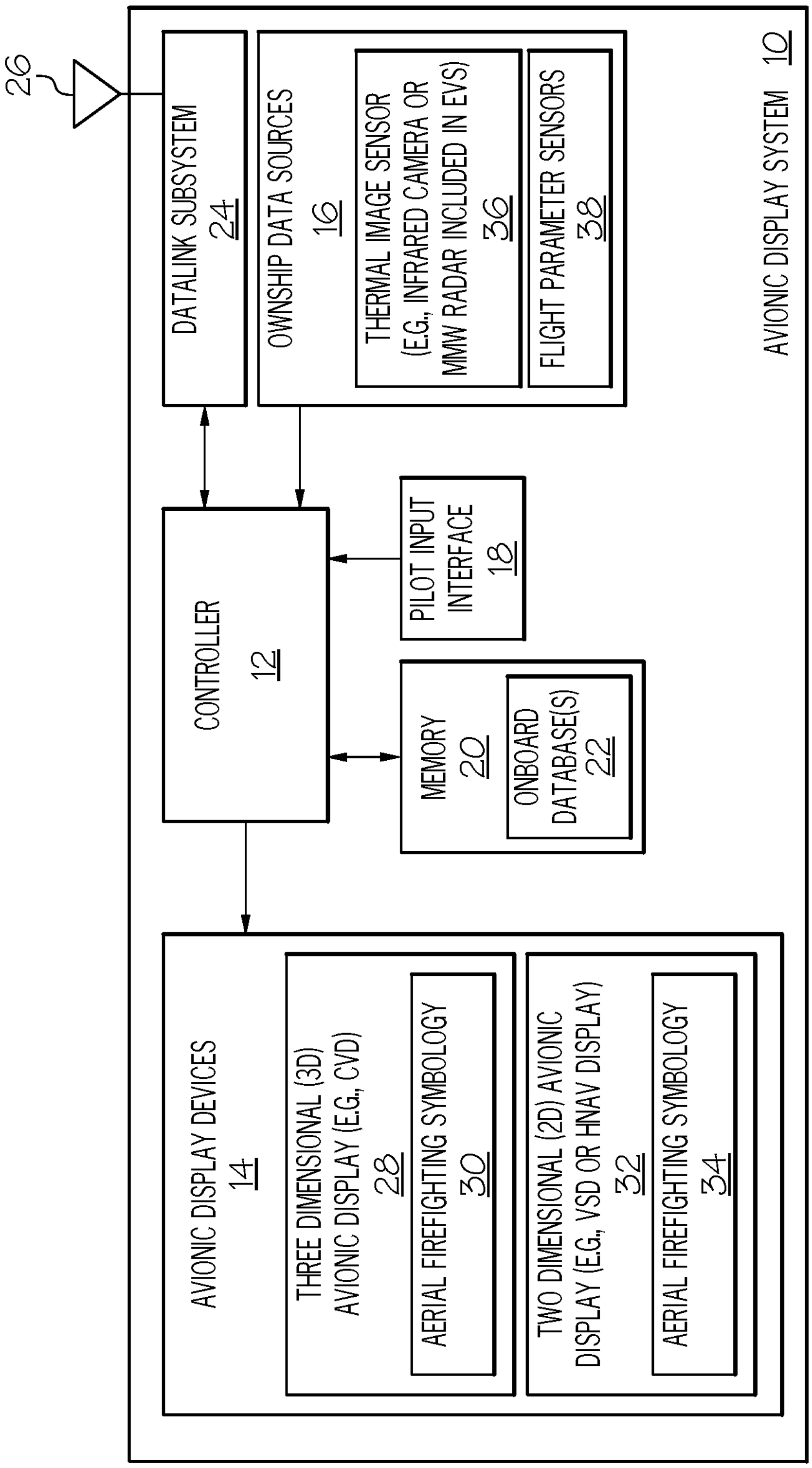
FIG. 1 is a block diagram of an avionic display system onboard an aircraft (A/C) and suitable for generating one or more avionic displays including aerial firefighting symbology, as illustrated in accordance with an exemplary embodiment of the present disclosure.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As appearing herein, the term "ownship aircraft" or "ownship A/C" refers to an aircraft equipped with the below-described avionic display system.

The following describes avionic display systems for generating avionic displays including symbology or graphics useful in aerial firefighting operations. The aerial firefighting symbology can include graphics representative of a fire map, which plots or charts active combustive regions or fire zones over a geographical area. The fire map may also contain other fire-related information, such as local fire temperature distribution charts, airborne-particulate matter density charts, the locations of any firebreaks or water resources in proximity of the A/C, and vector information pertaining to the rate and direction of fire propagation. The fire map may be initially provided to the ownship A/C from an external source (e.g., transmitted to the A/C en route to the fire-affected area) and/or initially compiled by the avionic display system utilizing at least one thermal image sensor carried by the A/C. The thermal image sensor can be, for example, an infrared camera or Millimeter Wave (MMV) radar included within an Enhanced Vision System (EVS). Over time, the avionic display system repeatedly updates the fire map in accordance with newly-received thermal image data provided by the thermal sensor; e.g., the appropriate regions of the fire map may be updated utilizing the thermal image data as the sensor Field of View (FOV) sweeps across different portions of the fire-affected area. The fire map may also be updated in accordance with data received from sources external to the ownship A/C, such as thermal imaging data supplied by other manned A/C, satellite, or unmanned A/C in proximity of the fire-affected area. Any newly-received fire map data may be compared to the stored fire map and corresponding adjustments may be made to update the fire map in accordance with the most recent or reliable data available. The avionic display is similarly updated to present the most recent version of the fire map to the aircrew of the A/C.

Embodiments of the avionic display system may visually integrate regions of the fire map onto corresponding portions of a two dimensional (2D) or three dimensional (3D) display environment. Graphics representative of actively-burning regions located within the sensor FOV may be visually distinguished from graphics representative of the fire map located outside the sensor FOV, but within the display FOV. In certain implementations, the avionic display system may also impart any fire graphics within the sensor FOV to have a varied (e.g. more striking) appearance relative to the fire graphics outside the sensor FOV. For example, the fire graphics within the sensor FOV may be generated to have an actively-burning appearance by applying a fire animation or by producing a visual representation of the real-time thermal data captured by the thermal image sensor. Additionally, in the case of a 3D Combined Vision System (CVS) display, the boundaries of the EVS image may be visually distinguish by shading the EVS image, by producing a boarder graphic around the EVS image, or in another manner. In the case of a 2D avionic display, such as a moving map or Horizontal Navigation (HNAV) display, graphics may be generated to indicate the current spread and range of the sensor FOV.

Additional graphics or symbology supporting aerial firefighting efforts may also be produced on the avionic display or displays generated by the avionic display system. Such graphics can visually convey airborne-particulate matter distributions, local fire temperatures, the location of nearby water resources, and the like. Visual indications of the speed and direction of fire movement, measured or forecast, can also be provided. In certain implementations, the avionic display system may produce symbology identifying one or more substantially level fire escape routes (egress passages) available to the ownship A/C. In other implementations, the avionic display system may generate graphics indicative of a region of space surrounding the A/C position and into which fire encroachment should be avoided. This region of space (hereafter, the "fire alert envelope") can also be utilized for alerting functionalities. For example, the avionic display system may generate alerts when fire encroachment into the fire alert envelope occurs and/or when the ownship A/C is unable to advance forward (or progress on current flight path if significant crab) at the present altitude without fire encroachment into the fire alert envelope. Similarly, an alert may be generated when the avionic display system determines that a substantially level fire escape route is not presently available to the ownship A/C. Such alerts may be produced as visual alerts expressed on the avionic display as, for example, alterations in the visual appearance (e.g., color coding) of the fire escape route graphics and/or the fire alert envelope graphics. An exemplary embodiment of an avionic display system suitable for generating one or more avionic displays including such aerial firefighting symbology will now be described in conjunction with FIG. 1.

FIG. 1 sets-forth a block diagram of an avionic display system 10, which is illustrated in accordance with an exemplary and non-limiting embodiment of the present disclosure. As schematically illustrated in FIG. 1, avionic display system 10 includes the following components or subsystems, each of which may be comprised of one device or multiple interconnected devices: (i) a controller 12, (ii) one or more avionic display devices 14, (iii) ownship data sources 16, (iv) a pilot input interface 18, (v) a memory 20 containing any number of onboard databases 22, and (vi) a datalink subsystem 24 including an antenna 26. Controller 12 includes at least first, second, third, and fourth inputs, which are operatively coupled to ownship data sources 16, to pilot input interface 18, to memory 20, and to datalink subsystem 24, respectively. Additionally, controller 12 includes at least first, second, and third outputs, which are operatively coupled to avionic display devices 14, to memory 20, and to datalink subsystem 24, respectively. In further embodiments, avionic display system 10 may include a greater or lesser number of components, which may be interconnected in various different manners and utilizing any combination of wireless or wired (e.g., avionic bus) connections. Although avionic display system 10 is schematically illustrated in FIG. 1 as a single unit, the individual elements and components of avionic display system 10 can be implemented in a distributed manner using any number of physically-distinct and operatively-interconnected pieces of hardware or equipment.

Avionic display devices 14 may include any number of image-generating devices, which each feature a display screen on which one or more graphical displays are produced. Avionic display devices 14 will often be affixed to the static structure of the A/C cockpit, whether as Head Up Display (HUD) devices, Head Down Display (HDD) devices, or a combination thereof. Alternatively, one or more of avionic display devices 14 may assume the form of or include a movable display device (e.g., head-worn display devices) or a portable display device, such as an Electronic Flight Bag (EFB), tablet, or laptop computer, carried into the A/C cockpit by a pilot or other aircrew member. In still further embodiments, avionic display device 14 may not be deployed onboard the A/C itself and may instead be remotely located therefrom; e.g., in certain implementations, the A/C may assume the form of an Unmanned Aerial Vehicle (UAV) included within a UAV system, and the operator or pilot may control the UAV from a remote location. During operation of avionic display system 10, controller 12 drives avionic display devices 14 to generate one or more graphical displays thereon. For example, and as schematically indicated on the left side of FIG. 1, controller 12 may drive avionic display devices 14 to generate: (i) a 3D avionic display 28 including aerial firefighting symbology 30, and (ii) a 2D avionic display 32 including aerial firefighting symbology 34. Avionic displays 28, 32 may be produced on a single display screen in, for example, a side-by-side or picture-in-picture format. Alternatively, avionic displays 28, 32 may be produced on separate display screens.

Controller 12 may comprise or be associated with any suitable number of individual microprocessors, flight control computers, navigational equipment, memories (including or in addition to memory 20), power supplies, storage devices, interface cards, and other standard components known in the relevant field. Controller 12 may include or cooperate with any number of software programs (e.g., avionics display programs) or instructions (e.g., as stored in memory 20) designed to carry out the various methods, process tasks, calculations, and control/display functions described more fully herein. Although illustrated as a separate block in FIG. 1, memory 20 may be partially or wholly integrated into controller 12 in embodiments. In one embodiment, controller 12 and memory 20 are produced as an Application Specific Integrated Circuit (ASIC), a System-in-Package (SiP), or a microelectronic module. Memory 20 may store data utilized to support the operation of avionic display system 10. Furthermore, as noted above, memory 20 may store any number of databases 22, which may include navigational, weather, and/or terrain databases. One or more of databases 22 may be included in an Enhanced Ground Proximity Warning System (EGPWS) or a Runway Awareness and Advisory System (RAAS). More generally, controller 12 and the other components of avionic display system 10 may be included or cooperate with any number and type of systems commonly deployed onboard A/C including, for example, a Flight Management System (FMS), an Attitude Heading Reference System (AHRS), an Instrument Landing System (ILS), and an Inertial Reference System (IRS), to list but a few examples.

Datalink subsystem 24 may assume any form enabling wireless bi-directional communication between the ownship A/C and one or more external data sources, such as a traffic control authority and/or neighboring A/C within the general vicinity of the ownship A/C. Datalink subsystem 24 may be utilized to provide Air Traffic Control (ATC) data to the ownship A/C and/or to send information from the ownship A/C to ATC in compliance with known standards and specifications. Additionally, in the context of avionic display system 10, information may be transmitted to controller 12 via datalink subsystem 24 pertaining to aerial firefighting efforts, such as air traffic information and instructions coordinating aerial and ground-based firefighting teams. Data may also be wirelessly received via datalink subsystem 24, which can be utilized by avionic display system 10 to further initially compile, augment, and update the fire map of the fire-affected area. In this regard, data may be wireless transmitted to avionic display system 10 describing additional thermal image data of the fire-affected region collected by other manned A/C, unmanned A/C (e.g., UAVs or drones), satellite, or ground-based resources able to collect such data.

With continued reference to FIG. 1, ownship data sources 16 include multiple onboard sensors and other components suitable for collecting data utilized in carrying-out the processes described herein. The particular types of data collected by ownship data sources 16 and provided to controller 12 will vary amongst different embodiments of avionic display system 10. Generally, ownship data sources 16 will include a number of flight parameter sensors 38, which supply data to controller 12 describing various different operational conditions of the ownship A/C utilized in generating avionic displays 28, 32. Data provided by ownship data sources 16 can include, without limitation: airspeed data; groundspeed data; altitude data; attitude data including pitch data and roll data; yaw data; geographic position data, such as Global Positioning System (GPS) data; data relating to gross A/C weight; time/date information; heading information; data describing current and forecasted atmospheric conditions, such wind speed and direction measurements; flight path data; track data; radar altitude data; geometric altitude data; and data pertaining to fuel consumption, to list but a few examples. Ownship data sources 16 may also include at least one thermal image sensor 36, which is capable of detecting fire heat signatures. Thermal image sensor 36 can be, for example, a forward-looking infrared camera or a MMW radar located within a radome beneath the A/C or otherwise affixed to the A/C.

Figure 2:
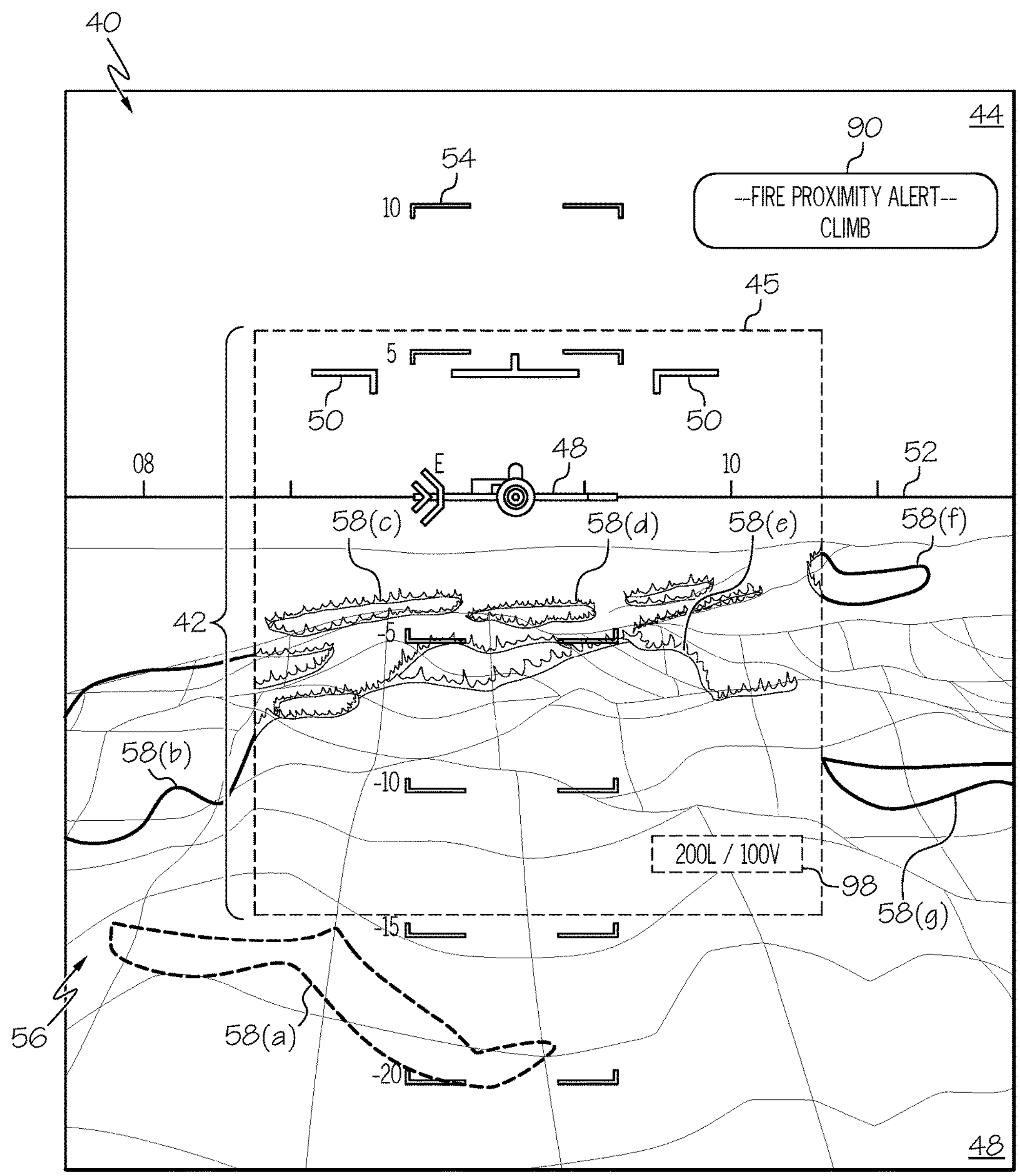
FIG. 2 is a screenshot of an exemplary three dimensional Combined Vision System (CVS) display, which is augmented to include aerial firefighting symbology and which is generated by the avionic display system of FIG. 1 in an embodiment.

FIG. 2 is a screenshot of an exemplary CVS 40 generated on one of avionic display devices 14 during operation of avionic display system 10 (FIG. 1), as illustrated in accordance with an exemplary embodiment of the present disclosure. CVS 40 generally corresponds with 3D avionic display 28 shown in FIG. 1, although different reference numerals are utilized to emphasize that 3D avionic display 28 need not assume the form of a CVS in all embodiments. As indicated in FIG. 2, CVS 40 is generated in a 3D perspective view format as seen from the vantage point of the A/C cockpit. In further embodiments, CVS 40 can be generated from other vantage points, such as that of a virtual chase plane following the ownship A/C. Two images are combined to yield CVS 40: an EVS image 42 and a Synthetic Vision System (SVS) image 44 of a Synthetic Vision Primary Flight Display (SV-PFD). EVS image 42 is a smaller, centralized image combined with or integrated into (e.g., scaled, aligned, and blended with) with SVS image 44, which is larger in scope. EVS image 42 is generated utilizing the real-time thermal imaging data captured by thermal image sensor 36 (FIG. 1). Comparatively, SVS image 44 is generated utilizing information contained within a terrain database, a navigational database, or a similar database included in databases 22 stored in memory 20 (FIG. 1).

When graphics are produced on CVS 40 visually denoting the area of CVS 40 encompassed by EVS image 42, such graphics are generically referred to herein as an "EVS window." An example of such an EVS window 45 is shown in FIG. 2 and produced as a dashed box or other border graphic denoting the boundaries of SVS image 44. Additionally or alternatively, a light shading or similar visual effect may be applied over EFV image 42 shown on CVS 40 to visually distinguish the display area encompassed by image 42 from the broader SVS image 44. Thus, as appearing herein, the term "EVS window" is utilized to broadly refer to one or more graphic elements or visual effects, which visually distinguish the display area encompassed by an EVS image (e.g., EVS image 44) from a larger display image, such as SVS image 44 of CVS 40.

In addition to the below-described aerial firefighting symbology or graphics, CVS 40 can also include other graphic elements, which visually convey pertinent flight parameters to the pilot or aircrew. Such additional graphic elements are well-known within the avionics industry and can include Horizontal Situation Indicator (HSI) graphics, Attitude Director Indicator (ADI) graphics, airspeed indicator graphics, altitude indicator graphics, Flight Path Vector (FPV) markers, and barometric pressure readouts, to list but a few examples. Many of these graphics are not shown in FIG. 2 to avoid unnecessarily obscuring the drawing. However, a few such graphics are shown in FIG. 2 for context and include an FPV marker 48 and ADI graphics 50, 52, 54. During operation, FPV marker 48 moves across the FOV of CVS 40 to indicate the current flight path of the ownship A/C. Similarly, ADI graphics 50, 52, 54 are updated, as appropriate, to reflect changes in the attitude of the ownship A/C. In the illustrated example, ADI graphics 50, 52, 54 include an ADI A/C symbol 50 in the form of two L-shaped polygons, a zero pitch reference line 52, and a pitch tape graphic 54.

CVS 40 is further generated to include aerial firefighting symbology 56, which visually conveys to a pilot (or other viewer of CVS 40) information pertaining a fire-affected region in the vicinity of the ownship A/C. In the illustrated example, aerial firefighting symbology 56 includes graphics representative of a number of active-combustive regions or fire zones. Seven fire zones are shown in the current FOV of CVS 40 and SVS scene 44, as represented by fire zone graphics 58(*a*)-(*g*). This example notwithstanding, multiple fire zone graphics may not always appear on CVS 40, depending upon a given fire distribution. For example, in the case of a structure fire, such a structure fire consuming one or more stories of a high-rise building, a single fire zone graphic may appear on CVS 40 depicting the unitary conflagration. Furthermore, avionic display system 10 revises fire zone graphics 58 on CVS 40 in accordance with changes in the fire distribution, as indicated by the most recent version of the fire map stored within memory 20 (FIG. 1). Thus, fire zone graphics 58(*a*)-(*g*) may appear to merge, separate, and otherwise vary as the real-world fire distribution evolves over time.

The fire graphics located within the current FOV of thermal image sensor 36 are advantageously generated to have a varied appearance relative to those fire zone graphics located outside of the sensor FOV, but within the current FOV of CVS 40. For example, and as indicated in FIG. 2, those fire zones (or fire zone portions) included within EVS image 42 and encompassed by EVS window 45 may visually represent the real-time thermal image data recorded by thermal image sensor 36 and, thus, appear to be actively burning or have a flame-like animation applied thereto. In contrast, those fire zones located outside of EVS image 42 may be presented utilizing static graphics (e.g., relatively thick boundary lines), which are mapped onto the 3D SVS terrain of SVS scene 44. Consider, in particular, fire zone graphic 58(*b*) shown in FIG. 2. As can be seen, the leftmost portion of graphic 58(*b*) resides outside of EVS image 42 and is drawn as a thick boundary line in a static or non-animated format. Comparatively, the rightmost portion of graphic 58(*b*) extends into EVS image 42 and is generated to reflect the real-time thermal sensor data, which depicts an actively-burning fire line mapped onto the 3D SVS terrain.

Figure 3:
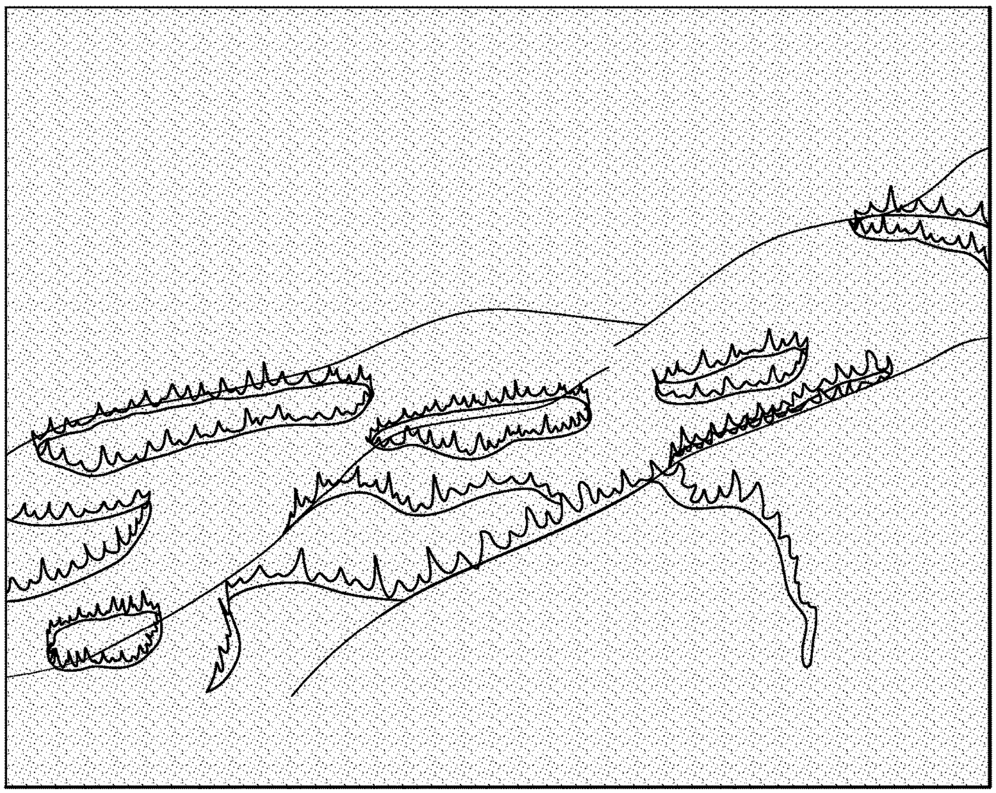
FIG. 3 is a picture of a real-world view from the cockpit of an A/C, which may correspond to the screenshot of the CVS display shown in FIG. 2.

In the above-described manner, CVS 40 enables a pilot to quickly distinguish those regions of the displayed fire map located within the current FOV of thermal image sensor 36 (and thus representative of the real-time thermal image data captured by sensor 36) from those regions of the displayed fire map located outside of the current sensor FOV (and thus representative of stored fire map data). This is highly useful in the context of aerial firefighting. Additionally, CVS 40 provides the pilot and other aircrew members with a clear, virtual representation of the A/C flight environment, which may vary significantly from the view seen from the A/C cockpit under actual or real-world conditions. This may be appreciated by briefly comparing the screenshot of CVS 40 shown in FIG. 2 to the corresponding real-world view, as seen from the A/C cockpit and shown in FIG. 3. As shown in FIG. 3, the real-world cockpit view is obscured by poor visibility conditions due to time of day (e.g., nighttime operation), instrumental meteorological conditions, and/or the presence of significant quantities of smoke, ash, or other airborne particulate matter within the airspace surrounding the fire-afflicted region.

Figure 4:
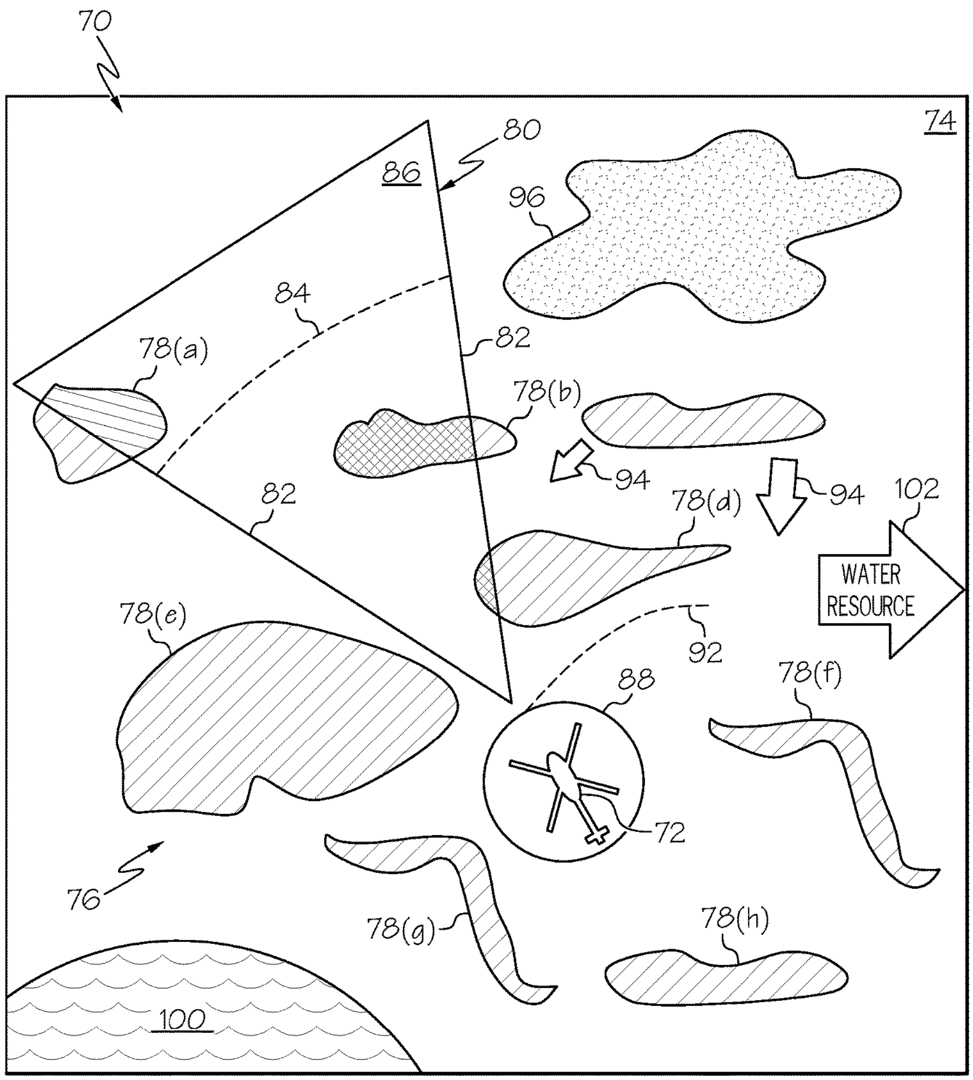
FIG. 4 is a screenshot of an exemplary two dimensional avionic display and, specifically, a moving map or horizontal navigation (HNAV) display, which further includes aerial firefighting symbology and which may be generated by the avionic display system of FIG. 1 in conjunction with the CVS display of FIG. 2.

Embodiments of avionic display system 10 may further generate one or more 2D avionic displays, which are augmented to include aerial firefighting symbology. The 2D avionic display can be produced as a Vertical Navigation (VNAV) display, such as a Vertical Situation Display (VSD); a Horizontal Navigation (HNAV) display, such as a 2D moving map display; a Multi-Function Display (MFD); or the like. Further illustrating this point, FIG. 4 presents a screenshot of an exemplary HNAV display 70, which may be generated by avionic display system 10 concurrently with a 3D avionic display, such as CVS 40 (FIG. 2). An ownship A/C icon 72 indicates the current horizontal position (latitude and longitude) of the ownship A/C within geographical area 74 encompassed by HNAV display 70. Aerial firefighting symbology 76 is further produced on HNAV display 70 and includes a number of fire zone graphics 78, which represent actively-burning regions within the FOV of HNAV display 70. Here, eight fire zones are shown and identified by fire zone graphics 78(*a*)-(*h*). Fire zone graphics 78(*a*)-(*h*) may distinguished from the other terrain included within geographical area 74 by shading, application of a fill pattern, or a similar visual effect. If desired, the boundaries of fire zone graphics 78(*a*)-(*h*) may be demarcated by relatively thick boundary lines or otherwise visually denoted on HNAV display 70.

HNAV display 70 further includes at least one graphic or icon 80 identifying the FOV of SVS image 44 contained in CVS display 40 (FIG. 2). Icon 80 can be produced as a triangular icon including two wedge line graphics 82, which converge toward ownship A/C icon 72. In this example, the angle between wedge line graphics 82 denotes the spread of the SVS FOV and the spread of the sensor FOV. In embodiments wherein the spread of the SVS FOV and the sensor FOV vary, icon 80 can be varied accordingly. An arc-shaped dashed line 84 is further provided to visually denote the distance or depth of the sensor FOV. Triangular icon 80 extends beyond arc-shaped dashed line 84 to further encompass an extended region 86. Extended region 86 thus represents the volume of space further shown in SVS image 44 and encompassed by EVS window 45, but extending beyond the current FOV of thermal image sensor 36. Controller 12 of avionic display system 10 may further visually distinguish between those portions of the fire zones located within the sensor FOV from those portions of the fire zones located outside the sensor FOV, but within the display FOV. For example, as indicated in FIG. 4 by variations in cross-hatch pattern, those portions of the fire map residing within the sensor FOV may be color coded to a first color (e.g., red or amber); those portions of the fire map within the SVS FOV, but outside of the sensor FOV may be color coded to a second color (e.g., amber); and those portions of the fire map outside of the SVS FOV may be generated in a third color (e.g. blue, white, or green). In further embodiments, different variations in the visual appearance of the fire graphics may be utilized to visually those regions of the fire map located within the sensor FOV, such as a changes to the opacity or transparency of fire zone graphics 78(*a*)-(*h*).

With continued reference to FIG. 4, HNAV display 70 is generated to further include a fire alert envelope graphic 88, which surrounds and may be centered about ownship A/C icon 72. Fire alert envelope graphic 88 identifies the boundaries of a virtual fire alert envelope, which surrounds the ownship A/C and which is designated as a fire buffer or designated fire-free zone into which fire encroachment should be prevented, to the extent possible. In certain embodiments, the fire alert envelope represented by graphic 88 (FIG. 4) may be defined by a predetermined radius surrounding the present horizontal position of the A/C. In this case, the radius may be selected based upon A/C type, thermal tolerances of the A/C components, and other factors. In other embodiments, the fire alert envelope may have more complex symmetrical or asymmetrical 3D shapes. Additionally or alternatively, the boundaries of the fire alert envelope may be actively adjusted in response to changes in any number of dynamic factors, such as local temperatures, wind speeds, and/or fire propagation parameters (e.g., the measured or predicted speed and direction of fire propagation). The boundaries of the fire alert envelope may also be adjusted based upon A/C position (altitude, latitude, and longitude) in certain instances. With respect to altitude, in particular, the current Above Ground Level (AGL) altitude of the ownship A/C may be considered in adjusting the fire alert envelope boundaries to accommodate variations in terrain elevation. In still further embodiments, the shape and/or dimensions fire alert envelope may be adjustable by pilot input, by the A/C owner, by the Original Equipment Manufacturer (OEM), or other such entity. In embodiments wherein graphics are produced on HNAV display 70 (or another avionic display) representative of the boundaries of the fire alert envelope, such graphics may be repeatedly or continually adjusted to reflect such alterations to the fire alert envelope boundaries. Thus, in certain embodiments, the radius and/or shape of fire alert envelope graphic 88 shown in FIG. 4 may change or morph, as appropriate, to reflect in real-time any adjustments to the fire alert envelope boundaries.

The appearance of the fire alert envelope graphic produced on the avionic display or displays generated by avionic display system 10 will vary amongst embodiments. In the embodiment shown in FIG. 4, fire alert envelope graphic 88 is generated as a circular marker, which may be overlaid with a partially transparent pattern or fill color. In certain implementations, the appearance of fire alert envelope graphic 88 may be modified as appropriate to generate visual alerts useful in the context of aerial firefighting. For example, the shading of fire alert envelope graphic 88 may transition from a pre-established informational color (e.g., white or green) to a pre-established caution or warning color (e.g., amber or red) when avionic display system 10 detects the occurrence of a fire-related alert event. For example, avionic display system 10 may generate such a visual alert on HNAV display 70 if determining fire has encroached into the fire alert envelope represented by graphic 88. Additionally or alternatively, avionic display system 10 may generate such an alert when determining that the ownship A/C can no longer progress in a forward direction or continue to proceed on the current flight path (if significant crab in the case of a rotary wing A/C) without undesired fire exposure, such as fire encroachment into the fire alert envelope represented by graphic 88.

Avionic display system 10 may determine whether the above-described alert conditions are satisfied based upon the current A/C position, A/C flight parameters (e.g., flight track, airspeed, altitude, etc.), current wind speed and direction measurements, terrain topology, fire distributions indicated by the stored fire map, fire vector information (e.g., the rate and direction of fire spread), and so on. In further embodiments, avionic display system 10 may generate a visual alert on HNAV display 70 (FIG. 4) and/or CVS 40 (FIG. 2) in a different manner. For example, and briefly returning to FIG. 2, a textual annunciation 90 indicating the alert condition and perhaps advising an responsive action (e.g., climb of a rotary wing A/C) may be produced on CVS. Various other audible and/or haptic alerts may also be produced in conjunction with such a visual alert, if so desired. In still further embodiments, multiple fire alert envelopes may be established around the ownship A/C and utilized to generate a series of graded alerts on the avionic display(s) generated by avionic display system 10, which vary in severity depending upon the urgency of the fire-alert condition.

Embodiments of avionic display system 10 may further monitor fire escape routes available to the ownship A/C when located within or flown into a fire-affected region. In one embodiment, avionic display system 10 continually monitors for the availability of at least one substantially level fire escape route; that is, a fire escape route or path available to the A/C, which avoids undesired A/C exposure to fire (or to highly elevated heat levels caused by fire) that does not require the ownship A/C to climb by more than a threshold amount. As an example, avionic display system 10 may establish such a substantially level fire escape route by repeatedly mapping or plotting a projected horizontal path, which extends from the present position of the ownship A/C to a fire-free zone and which avoids fire encroachment into the above-described fire alert envelope. In continually seeking and monitoring for the continued available of such a substantially level fire escape route, controller 12 of avionic display system 10 may consider various different factors or parameters, such as the present fire distribution indicated by the fire map route, the boundaries of the fire alert envelope, wind direction and speed, nearby flight obstacles, elevated terrain topology, firebreaks (e.g., bodies of water or areas devoid of vegetation), and other such information. Additionally, avionic display system 10 may further consider forecasted weather conditions and fire parameters, such as fire distributions projected into the near future based upon current fire locations, wind speed and direction, the recent direction and speed of fire movement, terrain topology, and any firebreaks in the vicinity of the ownship A/C.

When at least one satisfactory, substantially level fire escape route is identified by controller 12 of avionic display system 10, corresponding graphics visually identifying the fire escape route may be presented on one or more of avionic displays generated by system 10. An example of a fire escape route graphic 92 produced on HNAV display 70 is shown in FIG. 4 and generated as a dashed line color coded to an informational color (e.g., white or green). In further embodiments, fire escape route graphic 92 may be generated to have a different appearance (e.g., that of a corridor) and/or may be produced on a different avionic display; e.g., graphics denoting the fire escape route can also be generated on CVS 40 in addition to or lieu of graphic 92 produced on HNAV display 70. Furthermore, the appearance of fire escape route graphic 92 can be selectively modified when it is desired to produce a visual alert on HNAV display 70; e.g., the color of fire escape route graphic 92 may transition to a pre-established warning or caution color when the alert conditions described above are satisfied. Finally, in embodiments wherein multiple substantially level fire escape routes are identified by avionic display system 10, a single, preferred or optimized fire escape route may be presented on HNAV display 70 to prevent display clutter. Such a preferred fire escape route may be selected based upon any number of criteria, such as estimated pilot work load, fuel efficiency, proximity to other A/C, lateral separation between the ownship A/C and the fire zones, and the like.

The avionic display or displays generated by avionic display system 10 (FIG. 1) may be augmented to include yet further aerial firefighting symbology or graphics. Such additional firefighting symbology can include visual indications of local fire temperatures, as indicated by the latest-version of the fire map stored in memory 20. In one embodiment, color coding may be utilized to indicate the average temperatures of the fire zones; e.g., as indicated in FIG. 2 by different cross-hatch patterns, fire zone graphic 58(*a*) located in the lower left corner of CVS 40 may be generated in a different color relative to fire zone graphics 58(*b*)-(*e*) to denote that the area encompassed by graphic 58(*a*) has a higher average temperature than do the areas encompassed by graphics 58(*b*)-(*e*). The avionic display(s) may also be generated to include symbology indicative of fire movement, such as the speed and direction of fire propagation. Fire propagation indicators may be generated to reflect measured fire propagation metrics, forecast fire propagation, or a combination thereof. An example of such graphics is shown FIG. 4 wherein arrows 94 denote the direction (as indicated by arrow orientation) and speed (as indicated by arrow size) of fire movement for the body of fire represented by fire zone graphic 78(*c*). Such visually conveyed fire propagation information may help a pilot anticipate fire movement relative to the ownship A/C position and plan accordingly.

Still further aerial firefighting symbology may be produced on HNAV display 70, on CVS 40, and/or on another avionic display. For example, graphics (e.g., shaded region 96 further shown in FIG. 4) may be provided to demarcate airspace regions occupied by relatively dense clouds of airborne-particulate matter, such as a smoke or ash. This may be useful to a pilot in planning aerial firefighting operations as such regions of dense airborne-particulate matter are desirably avoided by the ownship A/C; e.g., to maintain visibility from the A/C cockpit and/or to avoid the ingestion of excessive quantities of Foreign Object Debris (FOD) by the A/C engines. If desired, graphics can be produced on CVS 40 and/or HNAV display 70 indicative of thermal sensor range limits; e.g., textual annunciations 98 identifying the lateral and vertical sensor range limits can be produced in SVS window 45 of CVS 40, as shown in FIG. 2. As a still further possibility, graphics 100 (FIG. 4) denoting the location of water resources can be identified on HNAV display 70 and/or CVS 40. Similarly, the location of nearby water resources can be indicated on HNAV display 70 if, for example, such water resources are located outside of the current display FOV. Arrow graphic 102 further shown in FIG. 4 demonstrates this possibility. The location of nearby water resources can be determined by recalling this information from a terrain database included in databases 22, utilizing thermal image sensor 36, via data received by datalink subsystem 24, or in another manner.

The foregoing has thus provided multiple embodiments of an avionic display systems for generating aerial firefighting symbology on avionic displays, which enhanced pilot situational awareness and decision-making during aerial firefighting operations. In an embodiment, the avionic display system includes an avionic display device, a thermal image sensor (e.g., an infrared camera or MMW radar device) configured to detect thermal image data external to the ownship, and a controller operably coupled to the avionic display device and to the thermal image sensor. During operation of the display system, the controller is configured to: (i) compile a fire map of a fire-affected area in proximity of the ownship A/C); and (ii) generate a first avionic display on the avionic display device including symbology representative of a FOV of the thermal image sensor and portions of the fire map outside of the FOV of the thermal image sensor. In embodiments, the controller may compile the fire map by recording and compiling thermal image data as the FOV of the thermal image sensor sweeps across the fire-affected area. The fire map may also be compiled from thermal imaging data provided by external sources, such as other manned A/C, unmanned A/C, or satellite. The avionic display can be a 3D avionic display, such as a CVS display including an EVS window denoting the sensor FOV. Additionally, or alternatively, the avionic display system may generate a 2D avionic display, such as a HNAV display, which includes wedge lines or other triangular graphic representative of the sensor FOV.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. An avionic display system onboard an aircraft, the avionic display system comprising:

an avionic display device;

a thermal image sensor configured to detect thermal image data external to the aircraft; and a controller operably coupled to the avionic display device and to the thermal image sensor, the controller configured to:

compile a fire map of a fire-affected area in proximity of the aircraft based, at least in part, on the thermal image data provided by the thermal image sensor;

generate a first avionic display on the avionic display device including graphics representative of a sensor field of view (FOV) of the thermal image sensor and portions of the fire map outside of the sensor FOV;

generate graphics representative of fire currently detected by the thermal image sensor and located within the sensor FOV; and produce the graphics representative of fire currently detected by the thermal image sensor to have a varied appearance relative to the graphics representative portions of the fire map outside of the sensor FOV.

2. The avionic display system of claim 1 wherein the controller is configured to generate the first avionic display as a three dimensional display having a window indicative of the sensor FOV.

3. The avionic display system of claim 1 wherein the controller is configured to generate the first avionic display as a two dimensional display including:

an aircraft icon representative of the current position of the aircraft; and graphics having a fixed position with respect to the aircraft icon and indicating a spread and range of the sensor FOV.

4. The avionic display system of claim 1 further comprising a datalink subsystem controller coupled the controller, the controller further configured to selectively update the fire map utilizing thermal imaging data received via the datalink subsystem from one or more external sources.

5. The avionic display system of claim 1 wherein the controller is further configured to:

establish boundaries of a fire alert envelope surrounding the aircraft; and generate symbology on the first avionic display representative of a current aircraft position and the fire alert envelope.

6. The avionic display system of claim 5 wherein the controller is configured to adjust the boundaries of the fire alert envelope at least partially based on one or more of a current aircraft position, current wind speeds, and local fire temperature proximate the aircraft.

7. The avionic display system of claim 5 wherein the controller is configured to generate a visual alert on the first avionic display when fire encroaches into the fire alert envelope.

8. The avionic display system of claim 5 wherein the controller is configured to generate a visual indication on the first avionic display when determining that forward movement of the aircraft at a present altitude will result in encroachment of fire into the fire alert envelope.

9. The avionic display system of claim 1 wherein the controller is further configured to:

establish whether a substantially level fire escape route is available to the aircraft utilizing the fire map; and if establishing that a substantially level fire escape route is available to the aircraft, generate graphics on the first display representative of the substantially level fire escape route.

10. The avionic display system of claim 9 wherein the controller is further configured to configured to generate a visual alert on the first avionic display when determining that a substantially level fire escape route is not presently available to the aircraft.

11. The avionic display system of claim 1 wherein the controller is configured to generate symbology on the avionic display indicative of forecast fire propagation.

12. The avionic display system of claim 1 wherein the controller is configured to generate the first avionic display to include a visual indication of lateral and vertical limits of the thermal image sensor.

13. The avionic display system of claim 1 wherein the first avionic display comprises a three dimensional avionic display, wherein the controller is further configured to generate a two dimensional avionic display concurrently with the three dimensional avionic display, and wherein the controller generates the two dimensional avionic display to include graphics representative of the sensor FOV and a FOV of the three dimensional display.

14. The avionic display system of claim 1 wherein the controller is configured to generate fire graphics within the sensor FOV to have an actively-burning appearance, while further generating fire graphics outside of the sensor FOV in a non-animated format.

15. A method carried-out by an avionic display system including an avionic display device, a thermal image sensor having a sensor field of view (FOV), and a controller operably coupled to the avionic display device and to the thermal image sensor, the method comprising:

at the controller, establishing fire map of a fire-affected area in proximity of the aircraft;

updating the fire map utilizing thermal image data received from the thermal image sensor as the sensor FOV moves across the fire-affected area;

generating a first avionic display on the avionic display device including graphics representative of the sensor FOV and portions of the fire map outside of the sensor FOV;

generating, on the first avionic display, graphics representative of fire currently detected by the thermal image sensor and located within the sensor FOV; and producing the graphics representative of fire currently detected by the thermal image sensor to have a varied appearance relative to the graphics representative portions of the fire map outside of the sensor FOV.

* * * * *